2 Sheets—Sheet 1.

J. R. DRODZEWSKI.

Assignor of two-thirds to J. McCarter & J. M. Ormsbee.

COUPLING FOR STEAM PIPES BETWEEN RAILWAY CARS.

No. 11,057. Reissued Jan. 21, 1890.

Witnesses.

Chas. B. Lechner

Louis G. Hallock

Inventor

Julius R. Drodzewski

Per Hallock & Hallock

Att'ys

N. PETERS, Photo-Lithographer, Washington, D. C.

J. R. DRODZEWSKI.

Assignor of two-thirds to J. McCARTER & J. M. ORMSBEE.

COUPLING FOR STEAM PIPES BETWEEN RAILWAY CARS.

No. 11,057. Reissued Jan. 21, 1890.

Witnesses.

Edgar B. Lochner

Louis G. Hallock.

Inventor.

J. R. Drodzewski

Per Hallock & Hallock

Attys.

N. PETERS, Photo-Lithographer, Washington, D. C.

UNITED STATES PATENT OFFICE.

JULIUS R. DRODZEWSKI, OF ERIE, PENNSYLVANIA, ASSIGNOR OF TWO-THIRDS TO JOSEPH McCARTER AND JOHN M. ORMSBEE, OF SAME PLACE.

COUPLING FOR STEAM-PIPES BETWEEN RAILWAY-CARS.

SPECIFICATION forming part of Reissued Letters Patent No. 11,057, dated January 21, 1890.

Original No. 363,374, dated May 24, 1887. Application for reissue filed October 25, 1887. Serial No. 253,368.

*To all whom it may concern:*

Be it known that I, JULIUS R. DRODZEWSKI, a citizen of the United States, residing at Erie, in the county of Erie and State of Pennsylvania, have invented certain new and useful Improvements in Couplings for Steam-Pipes between Railway-Cars; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to means for coupling the steam-pipes of one railway-car to those of another car; and it consists in certain improvements in the construction of the same, as will be hereinafter fully described, and then pointed out in the claims.

Figure 1:
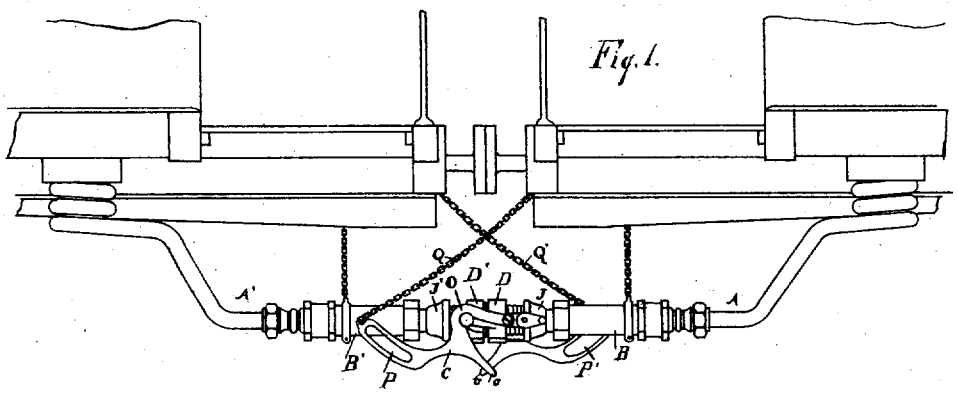
Figure 3:
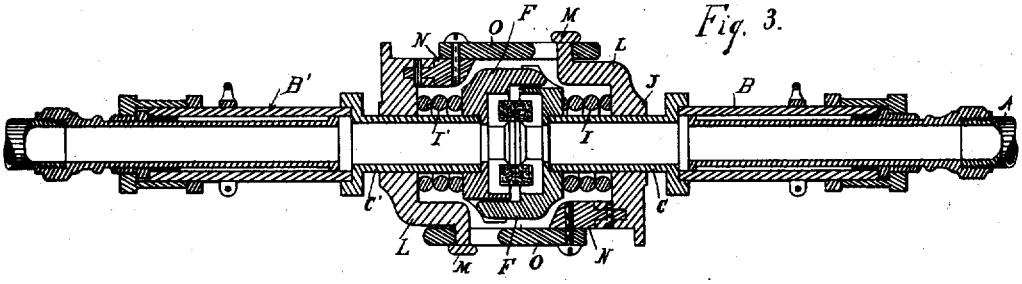
Figure 2:
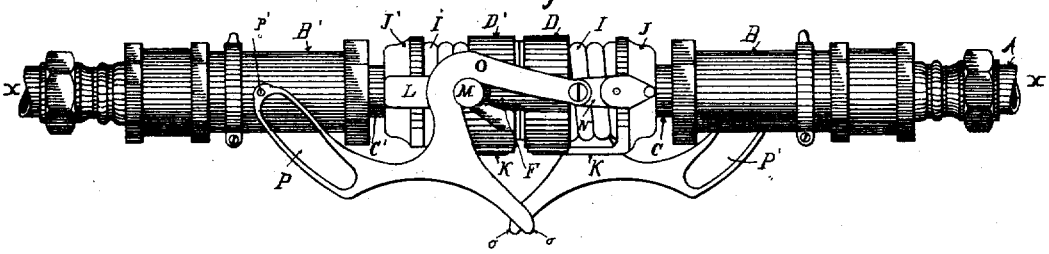
Figure 4:
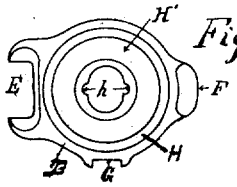
Figure 5:
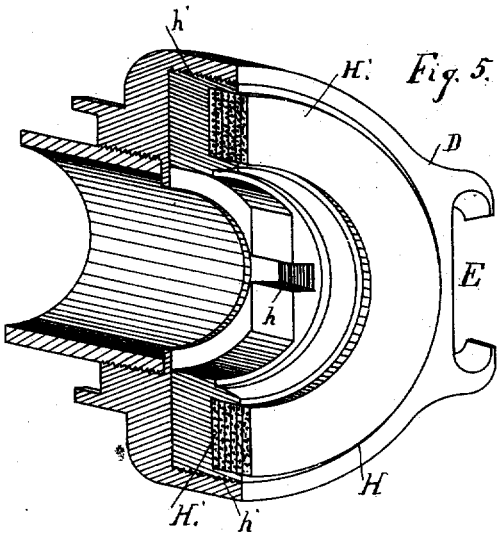
Figure 6:
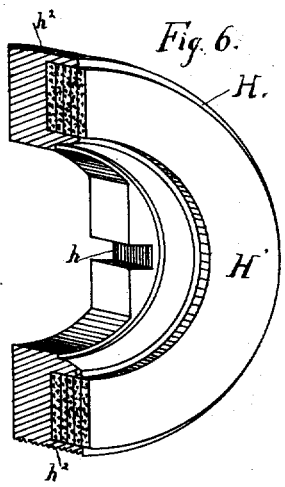
Figure 7:
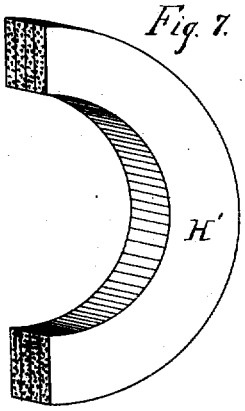

My invention is illustrated in the accompanying drawings as follows:

Figure 1 is a side elevation of the coupling device and its immediate surroundings. Fig. 2 is a like view of the coupling on an enlarged scale. Fig. 3 is a longitudinal central horizontal section taken on the line *x x* in Fig. 2. Fig. 4 is an end view of the coupler-head D or D′. Fig. 5 is a perspective view of one of said coupler-heads D or D′ in vertical longitudinal section on an enlarged scale. Fig. 6 is a like view of the packing-shell H detached from the head. Fig. 7 is a like view of the packing-gasket detached from the shell.

Like letters of reference refer to like parts in all the figures, and will be referred to in place in the following general description of the construction and operation of my device.

A A′ are the steam-service pipes of contiguous cars. B B′ are telescopic or slip joints on the ends of said pipes A A′.

C C′ are short pipe-sections extending outwardly from the telescopic joints.

D D′ are packing-heads screwed to the outer ends of the pipes C C′. These heads each have an annular concentric recess in their front face, with a screw-thread *h′* cut on the inside of their circumferential wall. (See particularly Fig. 5.)

H is a packing-shell, which is provided with a peripheral screw-thread $h^2$, whereby it can be screwed into the female screw-thread *h′* in the recess in the head D or D′, and it has an annular concentric recess on its face for receiving the packing-gasket H′. These shells are notched, as at *h*, to receive a wrench by which they are inserted or removed. The object of these packing-shells is to enable an old worn gasket to be removed and a new one to be quickly inserted at any time. The packing-gaskets protrude slightly beyond the walls of the shell, and when the shells are in place in the heads the gaskets extend slightly beyond the face of the heads, so that when the two heads are brought together only the gaskets will be in contact.

On the pipes C C′ back of the heads D D′ I put coiled springs I I′, and back of these springs I place sliding collars J J′, each of these collars being provided with an extension K, which extends over the spring and the head. As shown in the drawings, this extension K is in the form of a horn or finger, which enters the notch G in the head. The object of this extension is to guide the collar upon the head. The spring which is interposed between the collar and the head has its seats against those parts. On each of these collars are the two parts of a clamping device, which engage companion parts on the other collar when the coupling is effected. For example, on one side of the collar J there is a stud-pin M on forwardly-projecting arm L, and on the opposite side of the collar J′ there is a like pin and arm, and on the collar J opposite the pin M there is a clamping-hook O, pivoted to a jointed arm N, and on the opposite side of the collar J there is a like hook. Now, when the coupling is to be effected, the hook O on one collar engages its companion part—namely, the pin M—on the other collar, and so of the other hook and its companion part.

I am aware that couplers of this class have been devised having heads, a coiled spring on the pipe back of the head, a sliding collar back of the spring devices for effecting the coupling—as, for example, see Fig. 4 in the drawings of United States Patent No. 299,827, dated June 3, 1884; but in that construction each of the collars was only provided with one of the parts of the clamping device, the companion part of each clamping device being on the opposite head. In my device the operation of clamping either one of the clamping devices will compress both of the springs, because the clamping devices extend from collar to collar and not from collar to head. The great advantage of my device in this respect is that the draw upon the collars is exerted upon each side of them equally, so that they will not bind on the pipes.

The hooks O O here shown are of such a shape that when the heads D D′ are brought together the points *o o* of the hooks will engage the stud-pins M, and as they are pressed down upon the stud-pins they will bind and draw the heads tightly together, compressing the springs I I′ in the operation, and the resiliency of the springs will maintain the compact of the heads.

The clamping devices are provided with handles or operating-levers for convenience in operating. These handles are provided with springs *p p*, by which small chains Q Q′ are connected therewith. These chains connect the handles of each clamping device with the body of the car. The object of these chains is to automatically unfasten the clamps in case the cars should be uncoupled and the steam-pipes be left coupled, the slip-joints B B′ affording sufficient longitudinal movement to effect this. As a means for guiding the two heads into proper position one upon the other, I provide on opposite sides of each head a notch E and on the other opposite side an arm F, and when the two heads come together the arm on one head enters the notch on the other head.

I have thus described and shown convenient devices and mechanism for utilizing my invention. I am, however, aware that many of the features shown and described may be varied in their construction without departing from the spirit of my invention and good results obtained therefrom, wherefore I do not desire to limit myself to the exact construction shown.

What I declare as new is—

1. In a pipe-coupling of the class herein named, the combination, with the pipe-sections C C′, of heads on the ends of said pipe-sections carrying packing-gaskets, springs on the said pipe-sections back of said heads, sliding collars on the said pipe-sections back of said springs, and the two parts of clamping devices connected with each of the said collars, which engage companion parts on the opposite collar and draw the said collars toward each other, compressing the said springs.

2. In a pipe-coupling of the class herein named, the combination, with the pipe-sections C C′, of heads on the ends of said sections carrying packing-gaskets, springs on said pipe-sections back of said heads, sliding collars on said pipe-sections back of said springs, extensions on each of said collars, reaching forward over said springs and carrying the two parts of a clamping device, the parts of said clamping devices being so placed on each of said collars, as shown, as to engage a companion part on the opposite collar and draw said collars toward each other and compress the said springs.

3. In a pipe-coupling of the class herein named, the combination, with the pipe-sections C C′, of the heads D D′ on the ends of said pipes, having annular screw-threaded concentric recesses in their faces, packing-shells containing annular gaskets and having a peripheral screw-thread for screwing said shells into the recesses in the said heads, springs back of said heads on said pipes, collars sliding on said pipe back of said springs, and clamping devices on said collars for drawing the same toward each other and compressing said springs.

4. In a pipe-coupling of the class herein named, the combination, with the pipe-sections C C′, of heads D D′ on the ends of said pipe, having concentric annular screw-threaded recesses in their faces, packing-shells adapted, as shown, to screw into said recesses and having similar recesses containing packing-gaskets, and clamping devices for holding said heads in contact.

5. In a pipe-coupler of the class herein named, the combination, with the pipe-sections C C′, of the heads D D′ on said pipe-sections, coiled springs I I on said pipe-sections back of said heads, collars J J′, sliding on said pipe-sections back of said heads, and clamping devices for coupling said pipe-sections, consisting of the hooks O O and stud-pins M M, connected with said collars, substantially as shown.

J. R. DRODZEWSKI.

Witnesses:
JNO. K. HALLOCK,
CHAS. B. LECHNER.